Sept. 2, 1924.                L. SILBERSTEIN                1,507,212
                                   LENS
                          Filed Nov. 29, 1920          2 Sheets-Sheet 1

WITNESSES:                                    INVENTOR
                                           Ludwik Silberstein,
                                        BY
                                                ATTORNEYS.

Sept. 2, 1924.  L. SILBERSTEIN  1,507,212

LENS

Filed Nov. 29, 1920   2 Sheets-Sheet 2

WITNESSES:

INVENTOR
Ludwik Silberstein,
BY
ATTORNEYS.

Patented Sept. 2, 1924.

1,507,212

UNITED STATES PATENT OFFICE.

LUDWIK SILBERSTEIN, OF ROCHESTER, NEW YORK, ASSIGNOR TO EASTMAN KODAK COMPANY, OF ROCHESTER, NEW YORK, A CORPORATION OF NEW YORK.

LENS.

Application filed November 29, 1920. Serial No. 427,092.

*To all whom it may concern:*

Be it known that I, LUDWIK SILBERSTEIN, a subject of the King of Great Britain, residing at Rochester, in the county of Monroe and State of New York, have invented certain new and useful Improvements in Lenses, of which the following is a full, clear, and exact specification.

This invention relates to lenses and particularly to lenses having aspherical surfaces and adapted for use as objectives for photographic, projection and astronomical purposes.

There have been suggested hitherto certain specific formulæ for lenses having surfaces differing from the spherical, e. g., Cartesian surfaces; but there has not been discovered any method by which such surfaces might be systematically predetermined or computed. The relation between the surfaces and the constants of the lens has been a matter of trial and error.

I have discovered relations between the parameters of the surfaces of a lens, the thickness and refractive index of the glass whereby the aplanatism of the lens is ensured. By aplanatism, I mean the condition whereby the lens has an axial point free of spherical aberration and in which the sine condition is also fulfilled.

In fulfillment of these relations I have designed a type of lens which is characterized by the desired qualities. In order to explain the principles of my discovery and invention, reference will be made to the accompanying figures in which.

Figure 1:
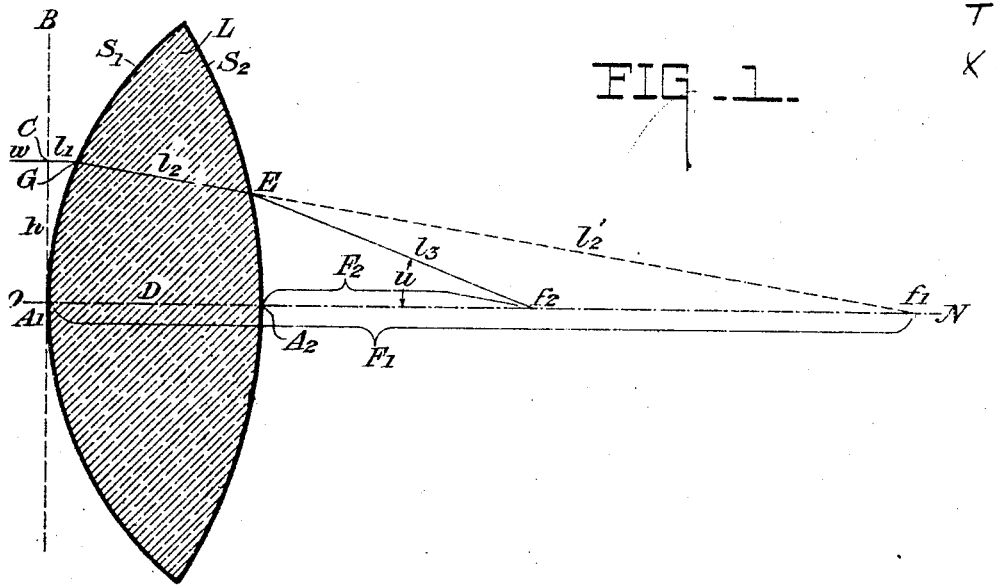
Fig. 1 is a diagram used to explain the theory.

In Fig. 1 a lens is shown in axial section, $S_1$ and $S_2$ being surfaces of revolution about the axis ON. The lens material has an index of refraction $\mu$, and the surface $S_1$ is of such form that all rays $w$ parallel to ON and incident from the left are so refracted that they are directed toward a common point $f_1$, the optical focus of this surface. They are, however, again refracted at the second surface $S_2$. Such a ray intersects at C a plane $A_1B$, which is tangent to the surface $S_1$ at $A_1$ on the axis, and is perpendicular to the axis, the distance $A_1C$ being $h$. The ray intersects surface $S_1$ at G, and $S_2$ at E; the distance CG is denoted by $l_1$, GE is $l_2$ and the line $Ef_1$, which is a continuation of GE, is of length $l'_2$. The distance $A_1f_1$ is $F_1$; $A_2f_2$ is $F_2$ and $A_1A_2$ is D, the axial thickness of the lens.

The equation stating that all parallel rays unite at $f_1$ in the refracting medium and defining the curve $S_1$ is $$l_1 + \mu(l_2 + l'_2) = k_1, \text{ a constant.}$$

This is a statement of the Fermat condition for a single surface. The limiting value is an axial ray, for which $l_1 = o$, and, therefore, $k_1 = \mu F_1$. Hence (1) $\quad l_1 + \mu(l_2 + l'_2) = \mu F_1.$ The equation (1) defines a Cartesian surface, to wit, an ellipsoid of revolution. The eccentricity, $e$, of the generating ellipse is easily shown to be $$e = \frac{l}{\mu},$$

its major axis being along $A_1N$, and one of its foci, that farther away from $A_1$, coinciding with the optical focus $f_1$. It is well known of such a surface separating two media that all rays from a certain axial point in the first medium converge to an axial point in the second medium; that is, it is free from spherical aberration. It is, however, necessary in a lens to have a second surface $S_2$, and this second surface must be so chosen that the lens as a whole will be free from spherical aberration. Fermat has stated the condition for this to be that the time required for light to pass from the point source to the point image through the lens by any path shall be the same. It is necessary, therefore, to define the second surface $S_2$ in such a way that, with the front surface $S_1$ as already defined, this condition will be satisfied. The Fermat condition for parallel rays, which for a single surface is given by (1), is expressed for the whole lens by the following equation:

(3^A) $\quad l_1 + \mu l_2 + l_3 =$ a constant.

The second surface will, therefore, be selected in conformity with equations 1 and 3^A. I now define surface $S_2$ so that the path $l_3$ which the rays actually traverse after being refracted into air, differs from the path which they would have covered in the refracting medium by a constant. In other words, I put $l_3 - \mu l'_2 = k'$, a constant. The limiting value for an axial ray being $k' = F_2 - \mu(F_1 - D)$, the equation defining the second surface is (2) $\quad l_3 - \mu l'_2 = F_2 - \mu(F_1 - D)$.

By adding equations (1) and (2) the terms in $l'_2$ cancel and the result is (3) $\quad l_1 + \mu l_2 + l_3 = F_2 + \mu D =$ a constant.

This exactly fulfills the Fermat condition for all incident rays parallel to the axis uniting in the same point $f_2$. In other words the lens L, thus constructed, is completely free of spherical aberration for all values of $h$.

The equation of the surfaces $S_1$ and $S_2$ contain four parameters, $F_1$, $F_2$, $\mu$, and D, which remain free. It has been suggested heretofore that lenses be made with ellipsoidal front surfaces, but with concave spherical rear surfaces with the center of curvature at $f_1$, so that $f_2$ and $f_1$ coincided. It is to be observed that whereas in such a scheme $F_1$ and $F_2$ are not independent, I have attained a much more general solution, permitting the independent choice of $F_1$ and $F_2$, at will. If $F_2$ is fixed, and $\mu$ chosen, the parameter $F_1$ and the thickness D still remain free. These are utilized so as to satisfy the sine condition up to $h^4$ terms.

The sine condition for parallel rays is, as is well known, $$\frac{h}{\sin u} = F$$

where $u$ is the angle of an emergent ray to the axis, and F, a constant, is the focal length of the lens.

Sin $u$ or its reciprocal may be developed into a power series of $h$, the following equation being obtained:

(4) $\quad \dfrac{h}{\sin u} = \dfrac{F_1 F_2}{F_1 - D} - \dfrac{F_1}{2(\mu - 1)} \left\{ 1 + \mu \left( 1 - \dfrac{F_1 - D}{F_2} \right) \right\} \dfrac{h^2}{F_1^2} +$ terms in $\left(\dfrac{h}{F_1}\right)^4, \left(\dfrac{h}{F_1}\right)^6$ etc.

The sine condition will be satisfied up to terms in $h^4$ if the coefficient of $h^2$ in the right hand member of equation (4) be made equal to zero. This gives the following equation between $F_1 - D$ and $F_2$:

$$1 + \mu \left( 1 - \frac{F_1 - D}{F_2} \right) = 0.$$

The arbitrary symbol $\gamma$ will be used to designate the ratio of the distance from the rear surface to the focal point of the front surface alone, to the distance from the rear surface to the focal point of the lens, and this may be written $$\gamma = \frac{A_2 f_1}{A_2 f_2} = \frac{F_1 - D}{F_2},$$

from which is derived the following simple formula:

(5) $\quad \gamma = 1 + \dfrac{1}{\mu}$

This expresses a necessary and sufficient condition for satisfying the sine condition up to terms containing $h^4$. If, therefore, the glass be first chosen, there is at once known the ratio of the parameters so that they satisfy the equation (5) and using these values in equations (1) and (2), there is obtained a lens of a single piece of glass that is rigorously free of spherical aberration and that, moreover, satisfies the sine condition up to $h^4$. This, in accordance with the usual terminology, would be called an aplanatic lens.

The length $F_2$ will be referred to as the "back focal length of the lens", this being a term used in manufacture, and $F_1 - D$ will be referred to as the "back focal length of the front surface," these terms being used for ease of reference and definition hereafter and in the claims to designate the distances along the axis from the rear surface of the lens to the focal points of the lens and the front surface respectively. In other words, the arbitrary symbol $\gamma$ indicates the ratio between the back focal length of the front surface and the back focal length of the lens.

Since $\mu$ is necessarily a positive value $\gamma$ is always greater than unity and is positive. Referring, therefore, to Fig. 1, $$\frac{A_2 f_1}{A_2 f_2} > 1.$$

That is to say, the back focal length of the lens is necessarily less than the back focal length of the front surface, which means that the second surface must be a collective or convex surface if the first surface is collective.

Figure 2:
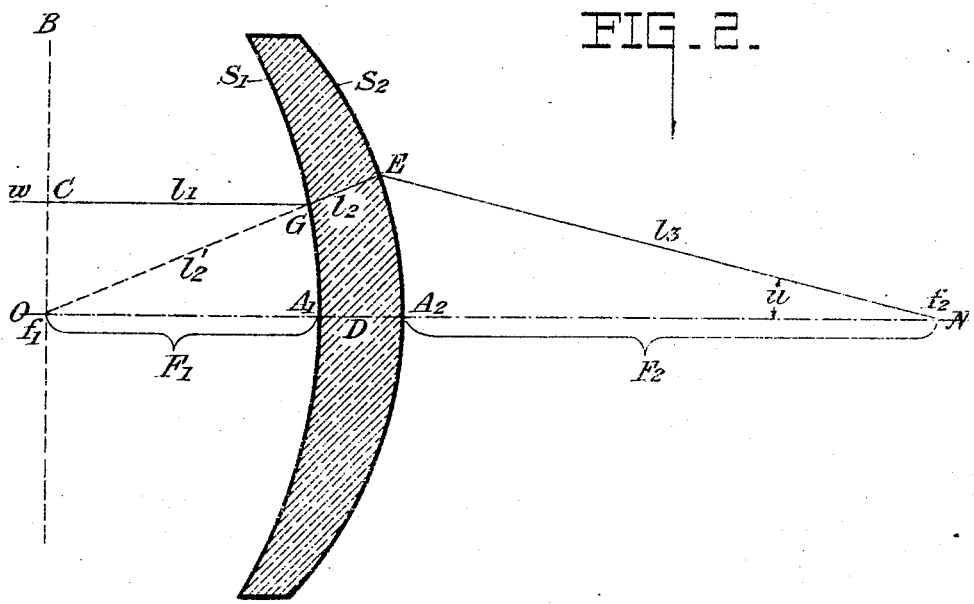
Figs. 2 and 3 are diagrams used to explain the theory when the front surface is concave.

Passing to the case of a dispersive front surface, reference will be made to Fig. 2, in which the reference characters have in general the same significance as in Fig. 1. In this case the front surface $S_1$ is defined by the equation.

$$(1^D) \quad l_1 - \mu l'_2 = (l-\mu) F_1$$

where $l_1$ is the length of the ray $w$ from a reference plane $f_1 B$ to the front surface and $l'_2$ the length of $f_1 G$, the continuation of the refracted ray to the optical focus $f_1$. The meridian curve of this surface is again an ellipse having the eccentricity $$e = \frac{l}{\mu}$$

and $f_1$ is that geometrical focus of the ellipse which is farther from $A_1$.

The second surface $S_2$ is so chosen as to satisfy the condition $$(2^D) \quad \mu(l_2 + l'_2) + l_3 = \mu(F_1 + D) + F_2$$

Upon adding these two equations, the terms in $l'_2$ cancel, giving $$(3^D) \quad l_1 + \mu l_2 + l_3 = F_1 + \mu D + F_2 = \text{a constant.}$$

This is the same in form as equation (3), and a lens satisfying equations $(1^D)$ and $(2^D)$ fulfills the Fermat condition for all incident rays parallel to the axis and is therefore completely free from spherical aberration.

Figure 3:
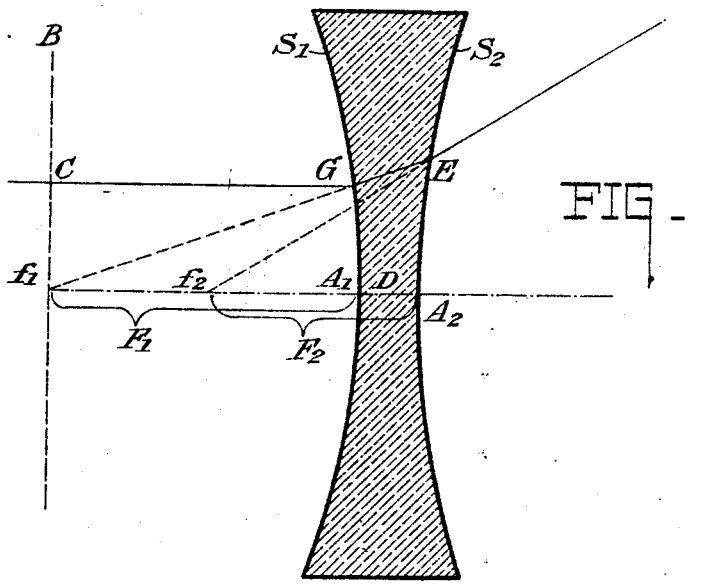

If aplanatism is also sought, the criterion is found by developing $$\frac{h}{\sin u}$$

in a power series as before and equating to zero the coefficient of $h^2$. As before, we express the ratio $$\frac{A_2 f_1}{A_2 f_2},$$

which is now $$\frac{F_1 + D}{F_2}$$

by $\gamma$, and we find the criterion to be as before $$(5^D) \quad \gamma = \frac{A_2 f_1}{A_2 f_2} = \frac{F_1 + D}{F_2} = l + \frac{l}{\mu}$$

and as this is necessarily positive and greater than unity, the criterion cannot be satisfied unless $A_2 f_2$ has the same sign as and is less than $A_2 f_1$. In other words, $f_2$ must lie between $f_1$ and $A_2$, the second surface increases the dispersion and must be negative. Such a lens is indicated diagrammatically in Fig. 3, the reference characters having the same significance as in Fig. 2.

A comparison of equations (1) and (2) with $(1^D)$ and $(2^D)$, with due regard to the signs of the quantities shows that they are really the same. In each case the equation of the first surface is $$CG + \mu(GE + Ef_1) = k$$

and of the second surface $$Ef_2 - \mu Ef_1 = A_2 f_2 - \mu(A_1 f_1 - A_1 A_2),$$

and $$\gamma = \frac{A_2 f_1}{A_2 f_2} = l + \frac{l}{\mu}$$

That is, the first surface is defined by the condition that the sum of the distance from any point on a reference plane to the corresponding point on the front surface, plus the product of the refractive index by the distance from that point to the focus of the front surface is a constant; and the second surface is defined by the condition that the difference between the distance from any point on the second surface to the focus of the whole lens and the product of the refractive index by the distance from that point to the focus of the first surface is a constant.

Achromatism may be also attained by constructing a lens, with the outer surfaces as above determined, of two cemented elements having the same refractive index for the principal color but of different dispersions. The cemented surfaces would be spherical and would be determined by the usual formulæ for paraxial achromatism. There is thus obtained an achromatic, aplanatic lens of two cemented elements with external aspherical surfaces and internal spherical surfaces. The well known equation for achromatism where the exterior surfaces have radii $r_1$ and $r_2$ is $$\frac{l}{r} = \frac{r_1 \nu_1 - r_2 \nu_2}{r_1 r_2 (\nu_2 - \nu_1)}$$

In the present case, this is sufficiently satisfied if the axial radii of curvature of the aspherical surfaces are used for $r_1$ and $r_2$. These values may be derived from equations (1) and (2) and are found to be $$(7) \quad r_1 = \frac{\mu - l}{\mu} F_1$$

$$(8) \quad r_2 = \left(\frac{\mu^2 - l}{\mu - \mu^2 + l}\right) F_2$$

This method of attacking the problem of determining the surfaces $S_1$ and $S_2$ can be extended to any number of successive surfaces and a compound objective be thus designed.

In the practical construction it is desirable for laying out the work for the grinder to plot the curves $S_1$ and $S_2$ in rectangular coordinates. Equation (1) may be re-written in the following form, $A_1$ being taken as the origin:

$$(1^A) \quad x + \mu\sqrt{(F_1-x)^2+y^2} = \mu F_1$$

and equation (2) may be re-written as follows, $A_2$ being now taken as the origin:

$$(2^A) \quad \sqrt{(F_2-x)^2+y^2} - \mu\sqrt{(F_1-D-x)^2+y^2} = F_2 - \mu(F_1-D).$$

Numerical values will be substituted for the parameters; and as equation ($1^A$) is linear in $y^2$ and equation ($2^A$) is quadratic in $y^2$, all points of the curves, with $x$ as the independent variable, are readily determined.

Figure 4:
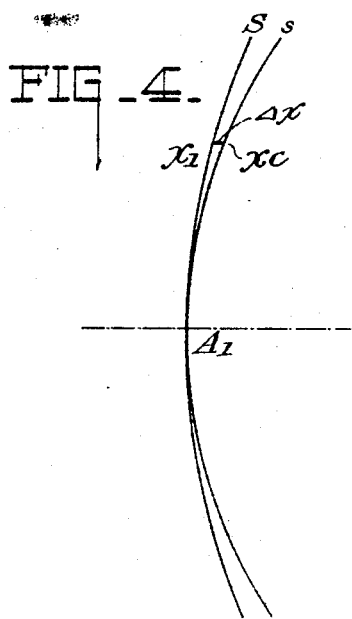
Fig. 4 is a diagram used to explain the divergence of a surface from a true sphere.

Another method of computing the coordinates of the surfaces is by determining the amount, $\Delta x$, by which for a given value of $y$, the value of $x$ for a point on the surface differs from the value of $x$ for an osculating sphere. In Figure 4 S indicates an aspherical surface, and $s$ an osculating sphere at the vertex A. For any given $y$, there are points having values of $x$ equal to $x_1$ on the surface and $x_0$ on the sphere, differing by $\Delta x$. An expression connecting these values for the front surface S, and its osculating sphere, is $$(9) \quad \Delta x = x_1 - x_0 = -\frac{\mu F_1}{8(\mu-l)^3}\left(\frac{y}{F_1}\right)^4$$

The expression for the second surface is $$(10) \quad \Delta x = x_1 - x_0 = \frac{l}{8}\left(4p - \frac{l}{r^3_2}\right)y^4$$

where $$(\mu-l)^2 \, 4p = (\mu+l)\left[\frac{l}{F^3_2} + \frac{\mu}{(F_1-D)^3}\right] - \frac{2\mu}{F_2(F_1-D)}\left[\frac{l}{F_1-D} + \frac{l}{F_2}\right].$$

In each of equations 9 and 10, the origin is taken as the intersection of the respective surface with the axis, and terms including higher powers than the fourth are omitted.

A concrete example illustrating my method of attacking a problem and giving data for a lens will now be given. The problem is to design an achromatic, aplanatic lens having a back focal length of 100 mm. This will require a two-piece cemented lens, and glasses having different dispersion and a common refractive index will be selected. A number of such pairs of glasses are known, among them being glasses for which $\mu D = 1.6118$ and having dispersions, $\nu_1 = 59.0$ and $\nu_2 = 36.9$.

Substituting 1.6118 for $\mu$, equation (5) becomes $$\gamma = 1.62042.$$

Since $F_2 = 100$, $F_1 - D = 162.042$.
If $D = 20$, say, $F_1 = 182.042$.

From equations 7 and 8, $r_1$ and $r_2$ are found to be 69.099 and 11496, respectively. To determine points of the first surface, it is necessary merely to tabulate them from equations ($1^A$) or (9). The latter gives:

$$\Delta x = x_1 - x_0 = -14.584\left(\frac{y}{100}\right)^4$$

or $$x_1 = x_0 - 14.584\left(\frac{y}{100}\right)^4$$

The front surface is thus somewhat flatter than the sphere.

For the second surface, tabulations may be made from equations ($2^A$) or (10). That latter gives $$x = x_0 + 12.81\left(\frac{y}{100}\right)^4$$

where $$x_0 = -0.4350\left(\frac{y}{100}\right)$$

or $$x = -0.4350\left(\frac{y}{100}\right)^2 + 12.81\left(\frac{y}{100}\right)^4$$

and differs only very slightly from a plane surface and lies between a sphere of radius 11496 and a plane tangent thereto at the axis.

Figure 5:
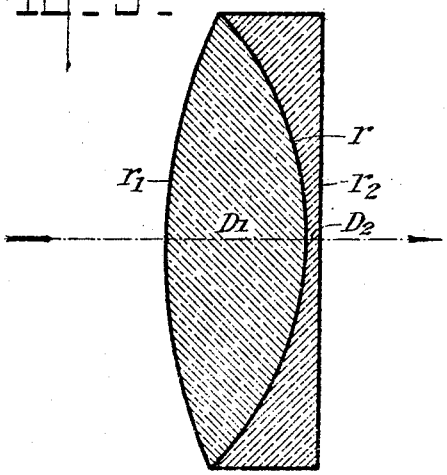
Fig. 5 is a section of a lens made in accordance with my invention.

From equations (6) the value of $r$, the radius of curvature of the cemented surface is found to be 40.9915. The thicknesses of the two components may be chosen as $D_1 = 18$ and $D_2 = 2$ respectively, if the available aperture of the lens is to be about F/2. The equivalent focal length of the lens is 112.2. A section of the lens thus designed is given in Fig. 5. This lens is completely free from spherical aberration and is corrected to satisfy the sine condition sufficiently for any purposes whatever. I have thus demonstrated fully not merely a single lens having certain desirable properties but a relation existing between the constants of lenses which may differ widely in form, the fulfillment of which condition will insure that such lenses will be corrected to the extent pointed out.

I consider as comprehended within the scope of my invention as hereinafter claimed all such lenses as may approximately fulfill these conditions, or embody the structural characteristics specified.

Having thus described my invention, what I claim as new and desire to secure by Letters Patent is:

1. A lens having two aspherical surfaces, the front surface being an ellipsoidal surface, and the rear surface being so selected that the Fermat condition for the whole lens is satisfied.

2. A lens having two aspherical surfaces, the relation between the index of refraction, $\mu$, and the ratio, $\gamma$, of the back focal lengths of the front surface and of the whole lens being expressed by the formula:

$$\gamma = l + \frac{l}{\mu}.$$

3. A lens, the front surface of which is aspherical and the back surface of which is so shaped that the distance from any point thereon from the focus of the lens differs by a constant from the product of the refractive index and the distance from the same point to the focus of the front surface.

4. A lens having one aspherical surface and the other surface so shaped that the Fermat condition is satisfied for the whole lens, the back focal length of the whole lens being less than and of the same sign as the back focal length of the front surface.

5. A lens, the front surface of which is collective and ellipsoidal, and the rear surface being so shaped that the whole lens is corrected for spherical aberration, the back focal length of the whole lens being less than and of the same sign as the back focal length of the front surface.

6. A lens having two aspherical surfaces, the front surface being an ellipsoidal surface, and the rear surface being so shaped that the Fermat condition is satisfied for the whole lens, the relation between the index of refraction, $\mu$, and the ratio, $\gamma$, of the back focal lengths of the front surface and of the whole lens being expressed by the formula:

$$\gamma = l + \frac{l}{\mu}.$$

7. A lens consisting of cemented elements, one surface being free from spherical aberration, the cemented surfaces being spherical and the other surface being so shaped that the Fermat condition is satisfied for the whole lens.

8. A lens consisting of cemented elements, the front surface being free from spherical aberration, the cemented surfaces being spherical and so chosen that the lens is chromatically corrected, and the rear surface being so shaped that the lens as a whole satisfies the Fermat condition and the sine condition.

9. A lens consisting of cemented elements, the front surface being ellipsoidal, the cemented surfaces being spherical, and the back surface so shaped that the back focal length of the lens is less than and of the same sign as the back focal length of the front surface.

10. A lens comprising two cemented elements having substantially the same index of refraction, $\mu$, for one color but having different dispersions, the front surface being collective and aplanatic, the cemented surface being spherical and the rear surface being so shaped that the lens as a whole satisfies the Fermat condition, the relation between $\mu$ and the ratio, $\gamma$, of the back focal lengths of the front surface and of the whole lens being expressed by the formula:

$$\gamma = l + \frac{l}{\mu}.$$

Signed at Rochester, New York, this 23rd day of Nov., 1920.

LUDWIK SILBERSTEIN.